Oct. 16, 1928.  
R. G. McKEE  
VEHICLE JACK  
Filed Feb. 21, 1927  
1,687,503  
2 Sheets-Sheet 2

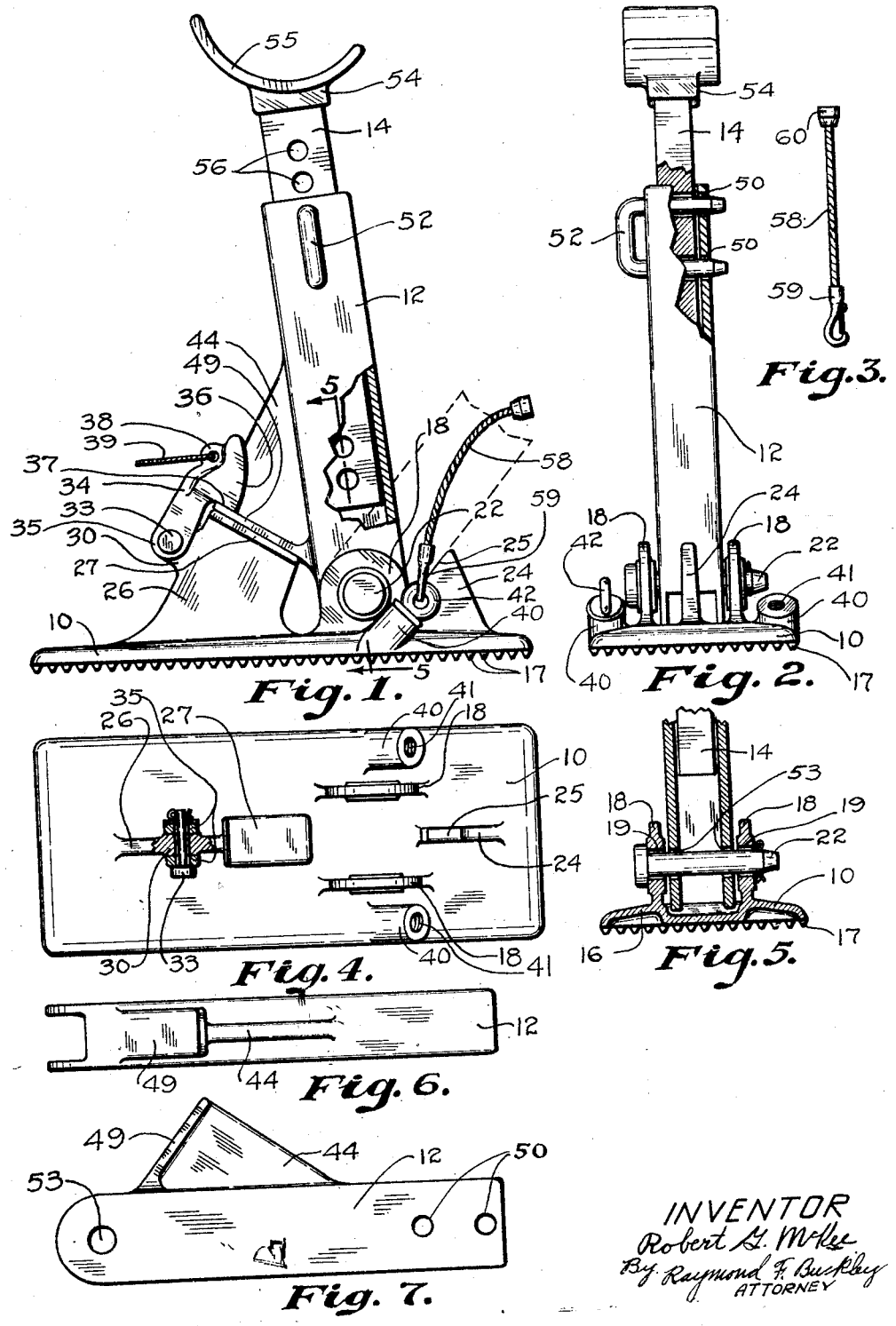

INVENTOR  
Robert G. McKee  
BY Raymond F. Buckley  
ATTORNEY

Patented Oct. 16, 1928.

1,687,503

UNITED STATES PATENT OFFICE.

ROBERT G. McKEE, OF INDIANAPOLIS, INDIANA.

VEHICLE JACK.

Application filed February 21, 1927. Serial No. 169,993.

This invention relates to automotive vehicle jacks whereby either the power of the vehicle, or an auxiliary power applied thereto, can be utilized to elevate a portion of the vehicle a sufficient height to remove either a wheel or a tire, and is an improvement in my co-pending application, Serial #153,984—filed December 10, 1926.

The object of the invention is to provide an improved jack which is of very simple construction, but which presents an extremely strong and efficient structure with a minimum number of parts.

The principal object of the invention is to provide a lifting device in which a specially constructed base is provided thereby enabling the lifting-bar guide to pivot thereon for the purpose of vaulting the weight being lifted to the desired position on the device.

A still further object of the invention is to provide a base which has a mechanism for limiting the travel of the guide-bar at both extremities within pre-determined limits.

Still a further object of the invention is to provide locking means which will automatically lock the jack in position after the weight of the object being lifted is transferred thereto.

Still another object of the invention is to provide improved means for anchoring the flexible connecting member, disclosed in the above mentioned co-opending application, to the base of the jack and to a driving wheel of the vehicle.

In the accompanying drawings:

Fig. 1 is a side elevation of one form of the jack.

Fig. 2 is an end elevation thereof.

Fig. 3 is a view of the flexible connecting member.

Fig. 4 is a plan view of the base showing in section the pivotal mounting of the locking member.

Fig. 5 is a vertical sectional view taken approximately on the line 5—5 of Fig. 1.

Fig. 6 is an end elevation of the lifting-bar guide.

Fig. 7 is a side elevation thereof.

Figure 17:
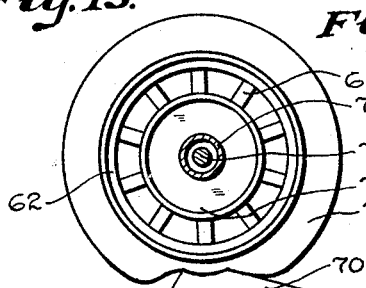

Figs. 17 to 20 inclusive, are somewhat diagrammatic and are drawn at a reduced scale; Fig. 17 representing a fragment of a vehicle illustrating a side elevation of one of the driving wheels as viewed from the underside of the vehicle, the axle and housing being shown broken away; a pneumatic tire is illustrated in a deflated state and resting upon a tapered block or ramp.

Figure 18:
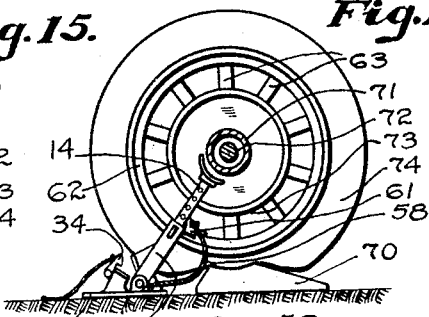

Fig. 18 is a view similar to Fig. 17, but illustrates the jack located in the approximate position required prior to elevating the vehicle thereon.

Figure 19:
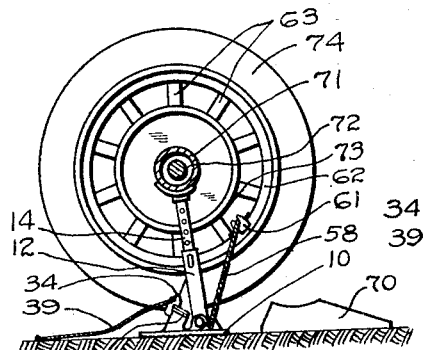

Fig. 19 illustrates a portion of the vehicle supported in mid-air by the jack and shows the position assumed by various parts of the jack which actuate in response to the weight of the vehicle being elevated thereon.

Figure 20:
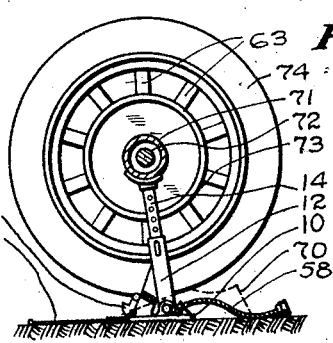

Fig. 20 illustrates the required position of the various parts prior to lowering the vehicle from the jack.

Figure 21:

Fig. 21 is a perspective view of the ramp.

The load supporting portion of the device includes essentially a base member 10, a hollow guide member 12 pivotally mounted on the base, and a lifting bar 14 telescoping within the guide member.

The base 10 consists of a hollow portion 16, which may have a plurality of pointed studs 17 projecting downwardly from the contact surface adjacent the ground, which create an initial gripping action against the supporting surface, either the ground or flooring, as the vehicle is being elevated thereon. A pair of vertically disposed lugs 18—18 are formed on the base and provided with horizontally disposed journaled bearings 19—19 into which a pivot pin 22 is loosely fitted. A rigid stop 24 is formed on the base, the contact surface 25 of which is formed at a pre-determined angle, thereby limiting the amount of forward travel or angle of the guide member and lifting bar 12; this feature being clearly illustrated by the dotted view of the guide in Fig. 1 of the drawings. 26 is a vertically disposed rigid web supporting at its upper extremity a transversely mounted pad or abutment 27, which may be set at an inclined plane.

30 indicates a perforated boss which is, in the present instance, cast integral with the web 26. 34 is a dog which has at one extremity a pair of perforated ears 35 forming a yoke which is fitted loosely over the boss 30 as clearly illustrated in Figs. 1 and 4 of the drawings. 33 indicates a pin which is loosely fitted to and inserted through the apertures in the ears 35, and also in the aperture in the boss 30 forming a pivotal mounting for the dog. The opposite extremity of the dog is provided with outwardly projecting flanges 36, which have abutment surfaces 37. Provisions for disengaging the dog are made in the present instance in the form of a perforated ear 38, which enables me to anchor to the swinging end of the dog, a hand operated connecting member, and for the purpose of illustration a substantially small flexible cable 39 is employed, it being of sufficient length to permit the operator to conveniently pull when the jack is in loaded position under a vehicle. 40—40 indicate bosses which may be angularly disposed relative to the horizontal base 10 from which they protrude, and which are usually provided with centrally located internal screw threads 41. Anchored to the bosses 40—40 are eye-bolts 42 which are usually fastened by means of external screw threads 43, provided on the barrel portion thereof.

Referring to the guide member 12, 44 indicates a rigid web supporting a transversely mounted pad 49 which is usually formed at such an angle that its contact surface is parallel with the contact surface of the abutment 27, when in the loaded position illustrated in Fig. 19 of the drawings. The numeral 50 indicates apertures provided in the guide 12. They are so spaced and proportioned as to permit the insertion of a U-bolt 52, illustrated more clearly in Fig. 2 of the drawings. Journal bearings 53—53 are provided in the guide member 12 in which the pin 22 is inserted.

The lifting-bar 15 is provided at its upper extremity with an expanded head portion 54. A semi-circular flange 55 is formed so that one extremity of the flange is substantially higher than the opposite extremity, when the lifting-bar is in an aproximate vertical position with respect to its longitudinal axis. The lifting bar, in the present embodiment, a rectangular bar, is provided with a plurality of apertures 56 so spaced as to register with the apertures 50 in the guide bar 12, so as to permit the insertion of the U-bolt 52.

58 indicates a flexible connecting member or cable having secured to one extremity a snap hook 59 and to its other extremity an expanded head portion 60. The snap hook 59 is adapted to hook into the eye-bolt 42.

Figure 8:
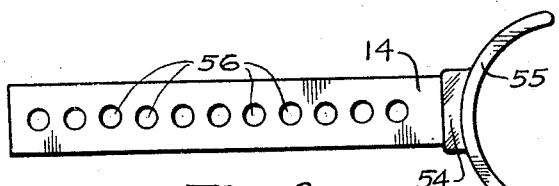
Fig. 8 is a side elevation of the lifting-bar.
Figure 9:
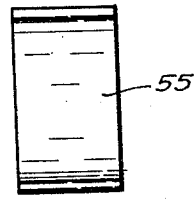
Fig. 9 is a plan view thereof.
Figures 10, 11, 12:
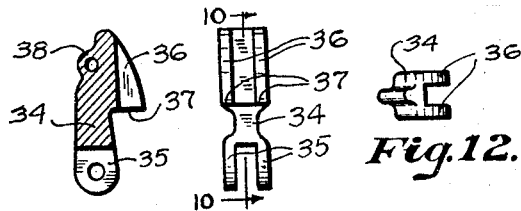
Fig. 10 is a sectional view of the locking member taken on the line 10—10 in Fig. 11.
Fig. 11 is an end elevation of Fig. 10.
Fig. 12 is a plan view of Fig. 10.
Figure 14:
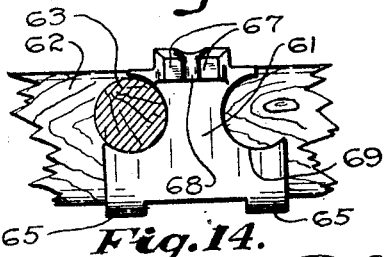
Fig. 14 is a plan view of the anchor plate illustrated in operative position on a fragment of a vehicle wheel.
Figure 13:
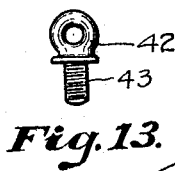
Fig. 13 is a side elevation of the eye-bolt.
Figure 15:
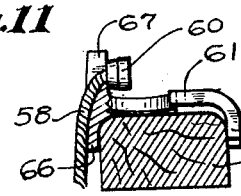
Fig. 15 is an end elevation thereof shown partly in section.
Figure 16:
Fig. 16 is a side elevation of Fig. 14.

Referring to Figs. 14 to 16 inclusive, 61 represents a portable anchor plate, 62 a portion of a wheel felloe and 63, a cross sectional view of one of the spokes of the wheel. The anchor plate 61 is curved to conform substantially to the inner periphery of the wheel felloe and may terminate at one extremity in transversely disposed flanges 65, the inwardly disposed faces of which engage with the side of the felloe, (as clearly illustrated in Fig. 15 of the drawings). 66 represents a flange disposed oppositely to the flanges 65—65. It is formed to engage with the opposed side portion of the wheel felloe engaged by flanges 65—65.

67—67 indicate projecting ears which are so spaced as to provide a slot 68 to receive the headed end portion of cable 58. The ears are provided with abutting surfaces against which the inner extremity of the head 60 of the cable engages. 69—69 are semi-circular apertures or hook portions which are fitted to hook to, or operatively engage with, one of the spokes of a wheel as indicated in Fig. 14 of the drawings.

To provide initial elevation required, when elevating a vehicle wheel having a deflated pneumatic tire, I provide a tapered block or ramp 70 so formed as to permit the vehicle to be rolled thereon with comparative ease.

Referring to Figs. 17 to 20 inclusive—71 indicates a conventional type of axle housing, and 72 a driving shaft operating within the housing. 73 indicates a vehicle wheel and 74 a pneumatic tire.

When operating the device, after the initial elevation has been obtained by rolling the vehicle wheel upon a block as indicated in Fig. 17, the jack is then located approximately in the position illustrated in Fig. 18. It will be observed in this figure that the anchor plate 61 is in operative position on the felloe 62, of the wheel, and that the cable 58 has one extremity hooked to the eye-bolt 42 in the base, and the opposite extremity attached to the anchor plate 61; further that the dog 34 is set in a position so that the force of gravity will cause it to automatically return to the position illustrated in Figs. 1 and 19 of the drawings. The abutment surfaces 37 of the dog 34, engage with the upper faces of the pad 49.

As the vehicle is propelled from the position illustrated in Fig. 18 to the loaded position illustrated in Fig. 19, the increasing pressure on the base of the jack, occasioned by the weight of the vehicle being transferred thereto, serves to force the pointed studs on the bottom of the base into the supporting surface thereby reducing the tendency of the base to slip due to the initial pressure being applied at the low bar angle illustrated in Fig. 18.

When power is applied to the driving wheel, it is obvious that, due to the loss of traction, the driving wheel being elevated can revolve through a short space. It will revolve only, until the slack in the cable is overcome, at which time the wheel is then capable of transferring the weight of the vehicle which it supports, over on the jack as illustrated in Fig. 19 of the drawings.

When it is desired to lower the vehicle from the jack, the cable 39 is pulled which causes the dog to fall to an inoperative position illustrated in Fig. 20. The wheel is revolved slightly in a direction which will relieve the tension from the cable, thereby permitting the anchor plate 61 and cable 58 to be detached from the wheel. Traction required for the vehicle to be lowered from the elevated position when utilizing its own power is acquired by utilizing the ramp 70, it usually being placed in the position illustrated by the dotted view in Fig. 20.

For elevating wheels other than driving wheels, it is obvious that my jack can be operated just as successfully, only the operation of attaching the cable and the anchor plate to the wheel may be eliminated, inasmuch as the driving wheels provide adequate traction for the jacking operation.

As changes of construction could be made within the scope of my invention, it is intended that all matters contained in the above description or shown in the accompanying drawings shall be interpreted as illustrative and not in a limiting sense.

Having thus described my invention, what I claim is:

1. In a vehicle jack, comprising a lifting bar, a journaled guide member for the bar, a base, a flexible tension member adapted to attach to the base and to a wheel of the vehicle, said base provided with a pair of vertically disposed ribs, the upper extremity of which terminate in transversely disposed surfaces for contact with the guide member.

2. In a vehicle jack, comprising a lifting bar, a guide member adapted to telescopically engage with the lifting bar, a base upon which the guide member is journaled, a flexible tension member adapted to attach to the base and to a wheel of the vehicle, said base having vertically disposed ribs for abutment pads, vertically disposed ears for pivotally mounting the guide member, and bosses formed on said base for attaching the flexible tension member thereto.

3. In a vehicle jack, comprising a base member, a lifting bar, a guide member for the lifting bar, a base member, a flexible tension member adapted to attach to a wheel of the vehicle and to the base, angularly disposed abutment pads formed on the base one of which is adapted to engage with an angularly disposed abutment pad formed on the guide member, and locking means for locking the engaging pads in position.

4. In a vehicle jack, comprising a journaled lifting element, a base, an anchor plate adapted to operatively engage with the felloe and spoke of a wheel of the vehicle, and flexible tension member adapted to engage with the base and with the anchor plate.

5. In a vehicle jack, comprising a journaled lifting element, a base, an anchor plate adapted to operatively engage with the felloe and spoke of a wheel of the vehicle, a flexible tension member adapted to engage with the base and with the anchor plate, said anchor plate having a body portion, lug means adapted to engage with the wheel felloe, and lugs for attachment of said flexible tension member.

In witness whereof, I have hereunto set my hand at Indianapolis, Indiana, this 12th day of February, A. D. one thousand nine hundred and twenty seven.

ROBERT G. McKEE.